(12) United States Patent
Doreian

(10) Patent No.: US 6,301,825 B1
(45) Date of Patent: Oct. 16, 2001

(54) SAFETY DEVICE

(76) Inventor: Clive Robert Doreian, 5 Orama Road, Shoreham VIC 3916 (AU)

( * ) Notice: Subject to any disclaimer, the term of this patent is extended or adjusted under 35 U.S.C. 154(b) by 0 days.

(21) Appl. No.: 09/409,384

(22) Filed: Sep. 30, 1999

(30) Foreign Application Priority Data

Sep. 30, 1998 (AU) .................................................. PP6257

(51) Int. Cl.$^7$ .................................................. A01K 97/06
(52) U.S. Cl. .................................................. 43/57.1; 43/25.2
(58) Field of Search .................................. 43/25.2, 54.1, 43/57.1; 206/315.11; 220/475; 224/920

(56) References Cited

U.S. PATENT DOCUMENTS

| | | | |
|---|---|---|---|
| 1,365,111 | * | 1/1921 | Lawrence ............................. 43/57.1 |
| 2,713,807 | * | 7/1955 | Herbert ................................ 43/57.1 |
| 3,668,802 | * | 6/1972 | Benward .............................. 43/57.1 |
| 3,800,456 | * | 4/1974 | Rowe .................................. 43/25.2 |
| 4,015,361 | * | 4/1977 | O'Reilly et al. ..................... 43/25.2 |
| 4,081,923 | | 4/1978 | Pruncutz ............................. 43/57.1 |
| 4,208,825 | | 6/1980 | Barnes ................................ 43/57.1 |
| 4,452,003 | * | 6/1984 | Deutsch et al. ..................... 43/25.2 |
| 4,667,433 | | 5/1987 | Thompson, Jr. ..................... 43/25.2 |
| 4,757,637 | | 7/1988 | Christensen ......................... 43/57.1 |
| 4,879,832 | | 11/1989 | Nelson ................................ 43/25.2 |
| 4,884,357 | * | 12/1989 | Clifford .............................. 43/25.2 |
| 4,936,040 | | 6/1990 | Reiter et al. ......................... 43/25.2 |
| 5,123,199 | | 6/1992 | Lysohir et al. ...................... 43/57.1 |
| 5,131,180 | | 7/1992 | Ives .................................... 43/25.2 |
| 5,440,829 | | 8/1995 | Parvin ................................ 43/57.1 |
| 5,535,541 | | 7/1996 | Fisher ................................ 43/57.1 |

FOREIGN PATENT DOCUMENTS

| | | | |
|---|---|---|---|
| 644346 | * | 7/1962 | (CA) ................................. 43/57.1 |
| 296 08 745 U 1 | | 8/1986 | (DE) . |
| 1130558 | * | 2/1957 | (FR) ................................. 43/57.1 |
| 2189121 | * | 10/1987 | (GB) ................................. 43/57.1 |
| 9-140307 | | 6/1997 | (JP) . |
| 9-294509 | | 11/1997 | (JP) . |
| 89/11791 | | 12/1989 | (WO) . |

* cited by examiner

Primary Examiner—Darren W. Ark
(74) Attorney, Agent, or Firm—Burr & Brown

(57) ABSTRACT

A safety device including a container having a hinged lid for safely retaining a fishing hook is provided. The safety device is of a generally truncated triangular shape and is provided with a hook retaining means internally in the base portion of the device for positively retaining the hook against inadvertent or accidental displacement or dislodgment when a fishing rod and fishing line to which the hook is attached are being transported or stored. A variety of retaining means are disclosed which act independently or in combination to maintain positive restraining of the hook by the retaining means. One form of the retaining means includes a pair of spaced apart posts, another form includes a pair of spaced apart inclined posts on either side of a third post which is oppositely inclined towards the posts on either side, whereas another form of the retaining means includes an open ended tube for receiving the posts when the device is in a closed condition. The device further includes an arrangement for maintaining tension on the fishing line to assist the retaining means in positively restraining the hook.

30 Claims, 2 Drawing Sheets

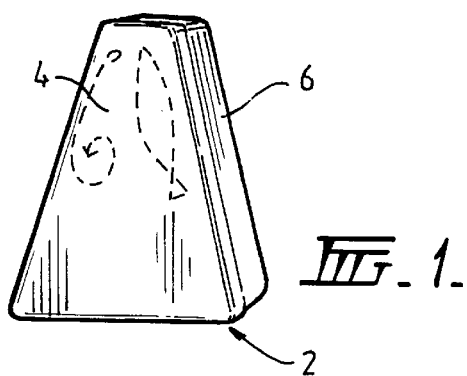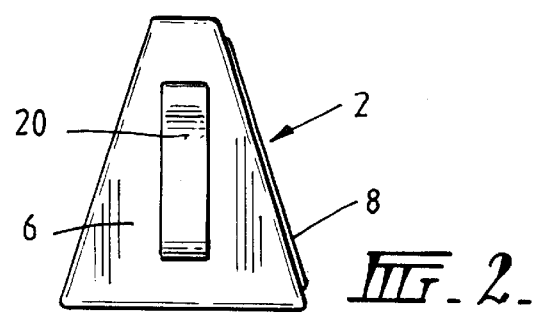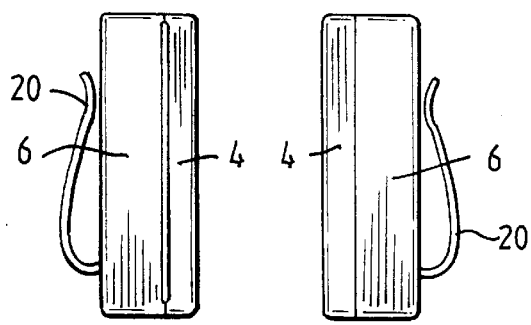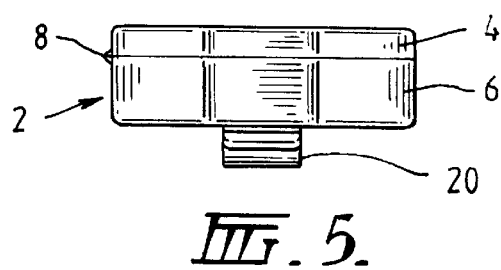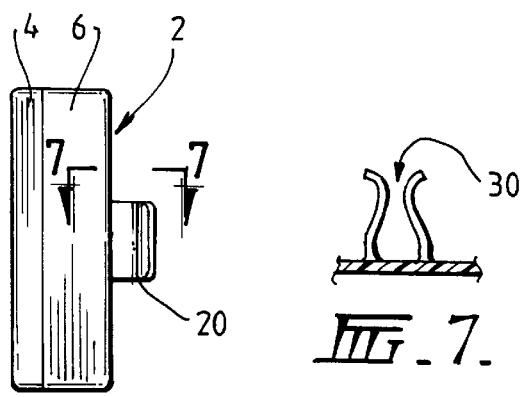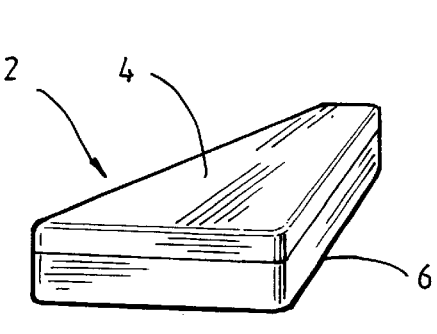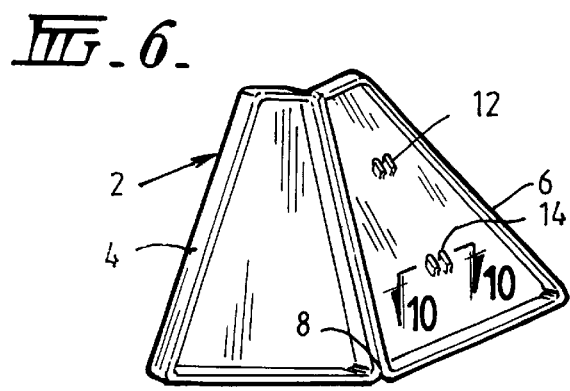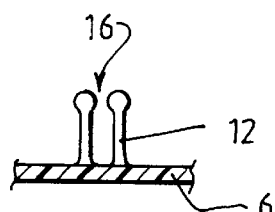

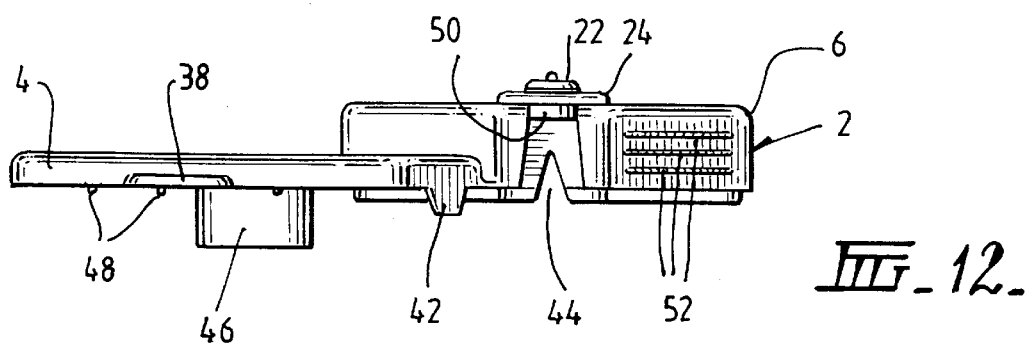
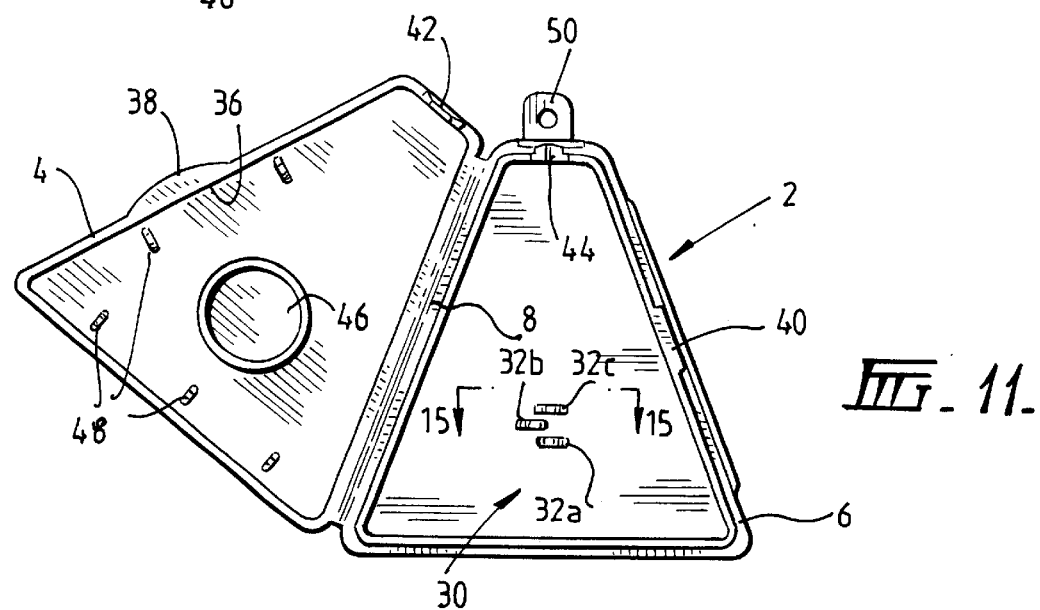
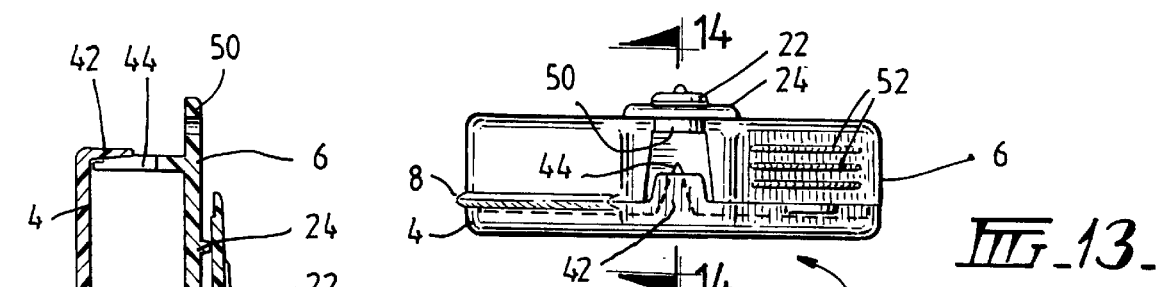
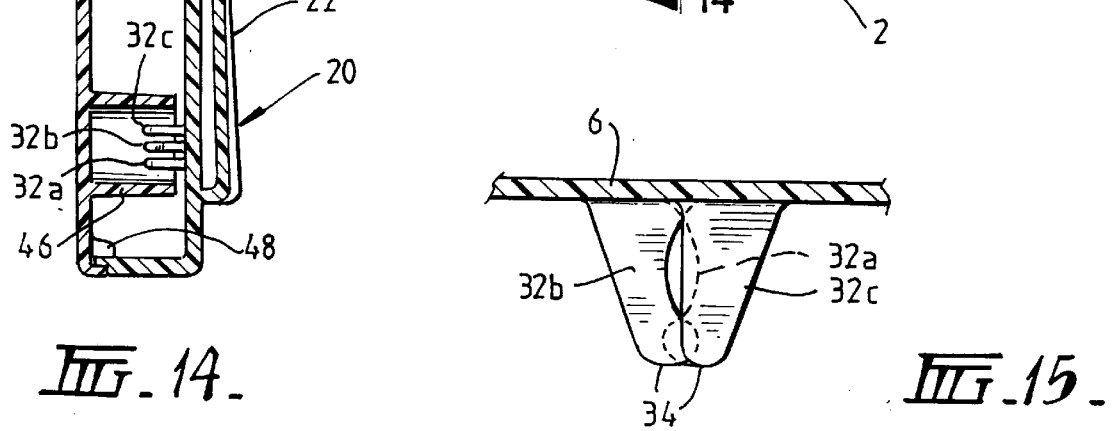

SAFETY DEVICE

The present invention relates generally to safety devices, particularly safety devices used in connection with the fishing industry. In particular, the present invention relates to a device and a method of using the device by persons primarily engaged in recreational fishing. Even more particularly, the present invention relates to a device for and method of protecting the hook located at or towards the end of a fishing line from injuring the fisherman or other people in close proximity, or preventing the hook from becoming embedded in substrates and from being entangled around the fishing rod or line or other rods and lines in close proximity. The present invention finds particular application as a fishing hook holding device or safety device in the form of a lidded container for enclosing the fishing hook when the fishing rod having the line to which the hook is attached is being transported or stored, thereby protecting the hook from damage and persons from injury.

Although the present invention will be described with particular reference to one form of the safety device of the present invention, being a small box with a hinged lid allowing access to the box to store the fish hook, it is to be noted that the scope of the present invention is not limited to the described embodiment, but rather the scope of the invention is more extensive to include other arrangements of the device and their use in other applications. One problem confronted by fishermen, in particular recreational fishermen, is being inadvertently pricked by the barbed end of the hook when transporting the fishing rod and line either in preparation for fishing or during fishing activities, such as for example when moving from one fishing spot to another fishing spot.

For many fishermen, the safe storage and transport of fishing rods having a hook or hooks still attached to the fishing line or lines on the rods is an important safety consideration and can present the fisherman with the difficult task of preventing the hooks from causing any harm to property and persons and at the same time protecting the needle sharp edge of the hook or valuable fishing fly from damage, which is not always easily solved. In the past, fisherman, both experienced and novice, have used pieces of cork or similar soft, resilient material to protect the hook and to prevent it from causing injury or snagging on other materials by embedding the barbed end of the hook into the cork or similar material so that the hook is held safely in the cork or similar. Owing to the resiliency of the cork or other material, the hook is retained safely in place in the cork. However, there are a number of disadvantages associated with using cork or similar materials. Penetration into the cork dulls the sharpened edge of the barb of the hook, thus making the hook less effective. The bait located on the hook needs to be removed before embedding the hook into the cork, which is annoying and time-consuming as the bait later needs to be re-affixed to the hook. If the bait is still attached to the hook, there is a chance that when the bait becomes disengaged from the hook the hook is unprotected, and thus can cause damage or injury.

Further, a problem associated with using the cork method of protecting the hook by piercing the hook into the cork is that the cork can become dislodged from the hook when it contacts a solid object as can often happen when the fishing rod is packed in the car, boat, in cupboards, under houses and or other places in which rods are usually transported or stored.

Additionally there is often more than one fishing rod being stored in the same place. The rods in close proximity to each other can catch on to one another so that their respective lines can often become tangled in an unintentional cross of rods, lines and sharp hooks, as well as becoming entangled with luggage and/or personal possessions stored close by. This greatly increases the chances of the hook causing injury or damage, or being damaged itself.

Failing the above methods, if the fisherman wants complete safety while transporting the fishing rods, the hook must be removed from the line and placed in a safe storage container. This is unsatisfactory for a number of reasons, including involving an amount of wasted time and effort, particularly if the fisherman regularly moves from one spot to another after spending a short time at each spot.

Removal of the hook from the line is not a real alternative since it is time-consuming and tedious as well as exposing the fisherman to an increased risk of injury by handling the hook more often. The ability to leave the hook on the fishing rod allows less handling by fisherman and reduces the risk of personal injury from the sharp point of the hook. The tasks associated with removing the fishing hook from the rod, of getting a knife out to cut the hook off the line, finding a container into which to place the hook, and the sometimes unnecessary discard of bait for sometimes only a short walk or drive to a new fishing location all detract from the pleasure of fishing and reduce the time spent actually fishing. Further, the fisherman on arrival at the new location must either replace bait on the hook or tie the hook back onto the fishing line and risk more handling of the sharp hook with attendant problems.

Although attempts have been made in the past to provide containers for safely storing hooks while in transit or while the rods are being stored, such attempts have not been entirely satisfactory for a variety of reasons. One such reason arises due to the container for storing the hook not being provided with a means for positively retaining the hook in place within the container, particularly when the lid is open. As a consequence of this, when the container is being closed or opened, or when in an open configuration, the hook can become dislodged from the container by being flicked or otherwise propelled out of the container with the risk that the sharp end of the hook can cause damage or injury. Thus, there is a need for a container in which the hook can be safely stored, which container is provided with a retaining means for positively retaining the hook in place even when the lid of the container is opened, thereby preventing the hook from inadvertently being dislodged and causing damage or injury.

Accordingly, there is a need for a device which can be used to safely contain the fishing hook while the hook remains on the fishing line attached to the rod. The present invention attempts to address the problems associated with existing methods of protection of hooks, protection of persons, protection of property and protection and care of fishing equipment including the protection of sharp hook points.

The present invention relates to a device which provides the recreational fisherman with an alternative to existing traditional and makeshift devices which are currently used in an attempt to store fishing hooks while still attached to a fishing line, reel, and fishing rod.

The present invention provides the recreational fisherman with a device that is simple to use and gives peace of mind to the fisherman concerning the safety of the sharp hook when the rod is stored or when in transit with the hook still attached to the line, by using the fishing hook holding device of the present invention.

According to the present invention there is provided a safety device particularly adapted for use with a fishing hook to protect the hook and/or to prevent the hook from causing damage or injury, including a receptacle means for receiving at least the sharp end of the fishing hook, said receptacle means being able to adopt an open configuration for receiving the hook and a closed configuration in which at least the sharp end of the hook is enclosed within the receptacle, said receptacle being further provided with a retaining means for retaining the hook in position when located in the receptacle, such that when the receptacle is in the closed configuration, the sharp end of the hook is protected from damage and/or is prevented from causing injury and/or damage, and when the receptacle is in the opened configuration the hook is prevented from inadvertently being displaced or dislodged from the retaining means.

Typically, one embodiment of the present invention is a generally one-piece, generally triangularly-shaped plastic case or box having a hinged lid and is of a size to suit its intended use, depending on the number and size of hooks to be protected by the device. The device can be provided in a number of different sizes or shapes. Typically, the receptacle of the present invention is coffin-shaped, having sides tapering from one end for receiving elongate lures having one or more hooks attached thereto. More typically, the receptacle may be elongate.

Typically, the device of the present invention has a fastening clip, hook, clasp or other means for attaching the device in a secure manner to a rod or other solid substrate, such as for example a belt or similar. More typically, the clip has a spring biased arm which bears against a transverse bar attached to the outer face of the base portion. Typically, the length of the arm is such so as to allow the device to be positively clipped onto the belt by the arm being longer than the width of the belt. Even more typically, the device is clipped to the shaft of the rod or to an eyelet provided on the shaft of the rod, or to some other part of the rod. Even more typically, the fishing line has tension applied to it to assist in keeping the device attached to the rod.

Typically, the device of the present invention has a lid which closes firmly onto a catch or part of a catch means. More typically, when the lid is open, the device is in a condition for receiving the hook and when the lid is closed the device is in a closed condition which provides protection for and from the hook by enclosing the hook.

Typically, the retaining means retains the hook in place when the lid is closed. It is to be noted that more than a single hook may be retained by the retaining means. More typically, the retaining means retains the hook or hooks in place when the lid is open, thereby preventing inadvertent dislodgment of the hook from the safety device when the lid is being opened or closed. More typically, the hooks may be replacement hooks having a length of fishing line attached to them in readiness for attachment to the line in case the fishing line breaks.

Typically, the retaining means of the present invention is a pair of spaced apart posts, tabs, bosses or similar. However, any suitable retaining means can be present, such as a fastening clip arrangement located inside the base of the device to secure the hook with line attached so that the hook and line can remain attached to the reel and to the rod even when the hook is located inside the device of the present invention. With the hook still attached to the fishing line, when the storage container is closed the present invention will protect and keep the hook safe, and persons and property safe from injury or damage, while the hook is in the container. More typically, the retaining means of the present invention is a group of three posts, spigots, tongues, tabs, tags or the like arranged in a tightly spaced apart group defining a gap or gaps therebetween.

Preferably, the posts etc are spaced apart from each other. More preferably, there are two posts in alignment with each other in spaced apart relationship for receiving the end or shank of the hook therebetween. Even more preferably, there is a third post located off-set from and intermediate of the two posts in alignment with each other, so as to form a grouping in which the third post is in opposed facing relationship with the other two aligned posts.

Preferably, each post extends upright from the base of the device. More preferably, the posts are angularly inclined so as to extend form the base at an angle to the plane of the base. Even more preferably, the two posts in alignment with each other are angularly inclined to extend in a first direction, whereas the third post in opposed facing relationship between the two spaced apart posts in alignment with each other is angularly inclined to extend in a second direction. The first and second directions can be the same or different. Preferably, the first and second directions are oppositely inclined to each other. More preferably, the two posts in alignment with each other are inclined to extend towards the third post. Even more preferably, the third post extends towards the other two posts.

Preferably, there is a gap defined between the two posts in alignment with each other, and a gap between the first and third posts and between the second and third posts. More preferably, the arrangement of the posts is such that the shank or the curved end of the hook is received in one or more of the gaps so as to be positively retained in place even when the lid is opened.

Preferably, the distal ends of the posts are provided with enlarged head portions, overhanging portions, undercut portions or the like so as to overlie the hook when located in one of the gaps to assist in keeping the hook in place. More preferably, the distal ends of the posts are deflected from their respective at-rest positions to allow the hook to be placed in the gap or gaps. Thereafter, the posts return to their respective at-rest positions to capture the hook in the gap or gaps.

Preferably, the retaining means also includes a tube, more preferable an open ended cylindrical tube extending from the lid of the device, more preferably from the underside of the lid, and even more preferably towards the base portion when the device is in the closed configuration. More preferably, the diameter of the tube is greater than the distances between the individual posts forming the retaining means so that the three posts are received in and covered by the tube when the lid is in the closed configuration. Most preferably, the distal end or rim of the tube contacts a part of the hook when located between any two of the three posts when the lid is in the closed configuration to further assist in safely retaining the hook in place in the device when the device is in a closed configuration, and also to further assist in reducing or preventing the tendency of the hook to inadvertently dislodge from the retaining means.

Typically, the device of the present invention is provided with a base portion and a lid portion. More typically the lid and base portions are hingedly connected together along one side, edge or face of the device. More typically, one of the edges, sides or ends of the base is provided with a fishing line receiving means, preferably a cut-out, groove, notch or similar, for receiving a part of the fishing line in use. More preferably, the cut-out is V-shaped, U-shaped or similarly shaped. Even more typically, one edge, side, end or similar of the lid is provided with a fishing line contacting member in the form of an extension, cover, flange, tab, lug or similar for contacting the fishing line when in the fishing line receiving means. Preferably, the extension etc is located so as to cover or close the cut-out in use, more preferably to partially close the cut-out in use so as to clamp or jam the fishing line in the cut-out to further assist in retaining the hook safely in place in the device when in the closed configuration by maintaining tension on the fishing line.

Typically, the device of the present invention can be in a range of colours, more typically a bright yellow colour, emphasising the safety aspects of the invention. The colour of bright yellow is an international colour that is recognisable as an indication of a hazard or warning, particularly relating to needle stick injuries and the like. However, it is to be noted that the device of the present invention can be provided in any suitable colour, size, shape, style or the like, and be made from any type of material. Preferably, the device is made from a plastics material.

Typically, the device is provided with a support for attaching the device to a key ring. More typically, the support is located at or towards the apex end of the device. Even more typically, the support is in the form of a ring integrally formed with the body of the device. It is to be noted that the present invention can be changed in many ways and be adapted to other uses, including adaptations to shape, size, colour, materials of construction and other applications of this present invention.

The present invention will now be described by way of example with reference to the accompanying drawings, in which:

FIG. 1 is a font perspective view of one form of the device of the present invention in a closed configuration;

FIG. 2 is a rear elevation view of the embodiment of FIG. 1;

FIG. 3 is a side elevation view of the embodiment of FIG. 1;

FIG. 4 is the other side elevation view of the embodiment of FIG. 1;

FIG. 5 is a top plan view of the embodiment of FIG. 1;

FIG. 6 is an underneath view of the embodiment of FIG. 1;

FIG. 7 is a sectional view through the line 7—7 of FIG. 6;

FIG. 8 is a top side perspective view of the embodiment of FIG. 1;

FIG. 9 is a top view of the device of FIG. 1 shown in an open configuration;

FIG. 10 is a sectional view taken along the line 10—10 of FIG. 9;

FIG. 11 is a plan view of another embodiment of the safety device of the present invention shown in an open configuration revealing details of the interior of the device;

FIG. 12 is an end view of the apex end of the device of FIG. 11 when in an open configuration;

FIG. 13 is an end view of the apex end of the device of FIG. 11 when in a fully closed configuration;

FIG. 14 is a longitudinal section along the line 14—14 of FIG. 13 through the apex and base of the device when in a fully closed configuration, showing the internal details in section; and FIG. 15 is an enlarged view along the line-15—15 of FIG. 11 of one form of the retaining means for retaining the hook in the form of oppositely inclined posts.

It is to be noted that the device shown in FIGS. 1 to 8 are all in the closed configuration.

In FIGS. 1 to 10 of the drawings, there is shown one embodiment of the device of the present invention being in the form of a container, box or similar having the shape of a generally truncated, solid triangle or pyramid, and generally denoted as 2. Box 2 is hinged along one side, thereby dividing the box into a lid portion 4 and a base portion 6. Hinge 8 allows box 2 to adopt an open configuration in which the lid 4 is open as shown in FIG. 9 of the drawings and a closed configuration in which the lid portion 4 of the box co-operatively engages with the base portion 6 to be described in more detail below. Lid 4 is hingedly movable with respect to base portion 6 to convert the box between the open and closed conditions.

Turning now to the base 6 of device 2, base 6 is provided with a V-shaped cut-out (shown in the embodiment of FIGS. 11 to 15 only) along one edge, typically at or towards the apex of the truncated triangular or pyramidal shaped body for receiving fishing line in use when a hook attached to the line is placed in device 2.

A retaining means in the form of a pair of spaced apart posts 10 is provided towards one end of the base portion 6 of the box, typically towards the end opposite the apex of the triangular body having the V-shaped cut-out, and optionally a similar pair of spaced apart posts 12 are provided at or towards the apex end of the triangular base portion of the box. In a preferred embodiment, the distal end of each post of each pair of posts 10, 12 is provided with an enlarged head portion 16 or similar. Typically, the head portion 16 is of a spherical shape as shown in FIG. 10. However, it is to be noted that the head of the posts and indeed the posts themselves can take any suitable shape or form. Additionally, there may be one, two or more separate retaining means or pairs or groups of retaining means located on the base portion 6, on the lid portion 4 or on both. In fact, the retaining means can take any suitable shape of form.

A particularly preferred form of the retaining means will now be described with particular reference to FIGS. 11 to 15.

In FIGS. 11 to 15 there is shown another embodiment of the device of the present invention having a retaining means 30 in the form of a group of three angularly inclined posts, 32a, 32b, 32c arranged slightly spaced apart from each other, defining gaps between the three posts. Each post is provided with an enlarged head portion 34 which can result in a number of ways, including having an overhanging ledge, an undercut rebate or similar. Posts 32a and 32c are arranged in spaced apart parallel relationship to each other and are angularly inclined in the same plane as both extend upwardly towards post 32b. Post 32b is located in a plane intermediate posts 32a, 32c but spaced apart from both posts 32a, 32c. Post 32b is angularly inclined towards posts 32a, 32c. In use, a part of the hook, either the shank or the arcuate portion, is located between the posts so that posts 32a, 32c are both located on one side of the hook and post 32b is located on the other side to firmly retain the hook in place during use of the device.

A square section tab 40 is located along the edge of the opening of base portion 6 remote from the hinged edge 8 intermediate the apex end and the base edge of the substantially triangular body.

Turning now to the lid portion of device 2, lid 4 is provided with a cover, tab or extension 42 along the edge or towards the apex of the triangular body for partially closing over the V-shaped cut-out 44 to secure or clamp the fishing line therebetween.

A cylindrical open ended tube 46 extends substantially perpendicularly from the underside of lid 4 at a location towards the base edge of the triangular body in correspondence with the position of the three posts 32a, 32b, 32c in order to close over these posts when device 2 is in the closed configuration. Tube 46 is of a diameter greater than the distance between the individual posts 32 so that all three posts can easily be received within tube 46 when the device is in a closed configuration.

A groove 36 is provided along the edge of lid potion 4 remote from the hinged edge between the apex and base edge of the lid in correspondence with tab 40 to receive tab 40 therein to ensure positive locking of lid 4 to the base 6 when the lid is closed. Tab 40 is received within groove 36 in a snap lock arrangement to maintain the lid in the closed configuration. A flange 38 is provided adjacent groove 36 to assist in opening and closing lid 4 by manipulation with fingers and thumb.

A plurality of reinforcing lugs or bosses 48 are provided around the perimeter of lid 4, particularly along the edge opposite the hinged edge 8 and the base edge opposite the apex of the substantially triangular shaped lid, to assist in maintaining rigidity in lid 4 and in positive locking of the lid to the base.

A clip 20 or similar is located on the external side of the base 6 of box 2. The clip 20 is for securely attaching box 2 to a fishing rod or eyelet of a fishing rod or similar. Clip 20 can take any suitable form. One form of the clip 20 is shown in FIGS. 3 and 4, a modified form of clip 20 is shown in FIGS. 6 and 7, and a further modified form in FIGS. 12, 13 and 14. A particularly preferred form is shown in FIGS. 12 to 14 in which clip 20 is in the form of a spring arm 22 associated with a transverse bar 24 provided on the external face of the base portion for contact by the distal end of arm 22 to bear against in order to provide more secure attachment of device 2 to the rod. It is to be noted that clip arm 22 is of sufficient length to enable the device 2 to be securely attached to a belt or to clothing worn by the fisherman. When device 2 is attached to the belt or similar clip arm 22 being longer than the width of the belt enables the belt to be received in the space between the clip arm and the outer face of base portion 8 between the proximal part of the clip and the transverse bar 24. Alternatively, the belt is clamped between arm 22 and bar 24 to secure device 2 to the belt.

A support element 50 having an eyelet or ring is provided at the apex end of device 2 for suspending device 2 in use or for attaching device 2 to a substrate or similar, such as, for example, to a key ring.

Base portion 6 is provided with a non slip surface on one outer side. One form of the non slip surface is a plurality, preferably three, of spaced apart parallel ridges 52 located along one of the tapering sides of the base, preferably along the side having tab 40. In operation of the device 2 of the present invention, the hook attached to the line of a rod and reel combination is taken and placed in the base portion 6 of box 2, such that the shank or arcuate portion of the hook is located between one pair of spaced apart posts, such as posts 32. This is achieved by aligning the hook between the spaced apart posts 32 and pushing down on the hook, thereby partially deforming the top of the posts to clear the respective heads 34 and deflecting the posts apart to provide clearance for the hook which can then be forced down into the gaps between the posts. Owing to the angle of inclination of the posts towards the adjacent post, the gap at the proximal ends of the posts is greater than the clearance between the distal ends of the posts which serves to retain the hook in the gap, preventing it from being dislodged inadvertently or accidentally.

The line to which the hook is attached is pulled so as to move the hook until the arcuate portion of the hook contacts one of the posts 32. In this position, the hook is held in place by the spaced apart posts 32 which acts as a retaining means for retaining the hook once it has been forced into place past the posts. The fishing line is then located in the V-shaped cut-out 44 provided on the base portion 6 between the cover 42 provided on the lid 4 so that when the lid is closed the cover 42 closes over the cut-out 44, so that the line is securely clamped in place to maintain tension on the fishing line. With the hook positioned between the posts, the lid 4 is closed which brings the end or rim of tube close to the distal ends of posts 32 so that the posts are fully received in the open tube. In the fully closed position, the end or rim of the open tube contacts part of the hook to retain the hook in position. The lid is securely fastened to the base by the plastic tab being received in the corresponding groove 36 and the lid snapped shut, whereupon the fishing line in the V-shaped cut-out 42 is clamped. As the hook is securely located by the retaining means and is totally enclosed in the box when the lid is in the closed position, the hook is safely located ready for transit or storage.

The device of the present invention can then be secured to the rod or to an eyelet of the rod by means of clip 20 engaging either the rod or the eyelet to secure device 2 to the rod or eyelet. In this position, the device protects the hook from damage and also prevents the hook from causing damage or injury as well as securely retaining the device 2 on the rod.

As the hook is securely enclosed within the device, there is no chance that the sharp end of the hook can inadvertently become embedded within or pierce other materials. Further, there is no chance that the hook can become entangled with other nearby rods or lines.

Advantages of the present invention include the following: The retaining means, in whatever form it takes, provides for positive retention of the hook or books within the safety device thereby preventing unwanted dislodgement of the hook.

The clip arrangement allows access to the inside of the device whilst it is attached to either the rod or belt of the fisherman so that the device does not have to be removed from the rod or belt for it to be opened. This saves time and allows replacement hooks to be conveniently stored in a safe and secure manner.

The described arrangement has been advanced by explanation and many modifications may be made without departing from the spirit and scope of the invention which includes every novel feature and novel combination of features hereindisclosed.

Those skilled in the art will appreciate that the invention described herein is susceptible to variations and modifications other than those specifically described. It is understood that the invention includes all such variations and modifications which fall within the spirit and scope.

What is claimed is:

1. A safety device adapted for use with a fishing hook having a shank portion and a sharp or barbed end to protect the hook and/or to reduce or eliminate the occurrence of the hook causing damage or injury, including a receptacle for receiving at least the sharp end of the fishing hook, said receptacle being able to adopt an open configuration for receiving the hook and a closed configuration in which at least the sharp end of the hook is enclosed within the receptacle, said receptacle being further provided with a positive retaining means for positively retaining the hook in position in the receptacle when located in the receptacle, when the receptacle is in the closed configuration or in the open configuration, said positive retaining means being in the form of three spaced-apart posts, said three posts being positioned such that a plane passes through all three of said posts, a first and a second of said posts each having a proximal end attached to said receptacle, intermediate portions on one side of said plane and end portions on an opposite side of said plane, a third of said posts having a proximal end attached to said receptacle, an intermediate portion on said opposite side of said plane and an end portion on said one side of said plane, said positive retaining means retaining the hook against inadvertent or accidental displacement from the receptacle when the receptacle is in the open configuration or in the closed configuration, thereby protecting the sharp end of the hook from being damaged or from causing injury or damage.

2. A safety device according to claim 1 in which the receptacle is a lidded container having a lid portion hingedly connected by a hinge means to a base portion along one side or edge of the device, said hinge means allowing movement of the lid portion relative to the base portion, thereby allowing the device to adopt an open configuration and a closed configuration.

3. A safety device according to claim 2 further including a fastening means for attaching the device in a secure manner to a fishing rod or part of a fishing rod or to a solid substrate.

4. A safety device according to claim 3 in which the fastening means is a clip, hook, clasp or clamp for attaching the device to the shaft of the fishing rod or to the eyelet of the fishing rod or to some other part of the rod.

5. A safety device according to claim 4 in which the clip, hook, clasp, or clamp includes a resilient arm portion having a distal end arranged so that the distal end is urged against a transverse bar provided on an outer surface or face of the base portion to maintain the distal end of the arm in contact with the bar for assisting in securing the safety device to the fishing rod and/or to capture a part of the rod between the device, the clip, hook, clasp, or clamp and the bar.

6. A safety device according to claim 5 in which the resilient arm is of a length sufficient to enable the device to be securely attached to the rod or to clothing, particularly a belt, in which the rod, belt or clothing is received either wholly or partially in a space defined between the resilient arm and the outer face of the base portion and is retained in place by the transverse bar or is clamped between the arm and transverse bar.

7. A safety device according to claim 2 in which the lid portion is provided with a positive locking means in the form of a snap lock for releasable connection to the base portion to retain the device in a locked configuration.

8. A safety device according to claim 2 in which the base portion of the receptacle is provided with an internal surface and the three posts extend from the internal surface of the base portion.

9. A safety device according to claim 8 in which there is a space or gap between each adjacent pair of posts of the three spaced apart posts for receiving a part of the hook to positively retain the hook in the space or gap in which the hook is received.

10. A safety device according to claim 9 in which the three posts are capable of being deflected or distorted away from each other to enlarge the gap or space between the posts for receiving the hook in use.

11. A safety device according to claim 10 in which two of the three posts are arranged in side by side, spaced apart alignment with each other, and the other of the three posts is located off-set from and in a plane intermediate of the two posts in spaced apart alignment with each other, so as to form a grouping of three posts in opposed facing relationship with the two posts on one side and the third post on the other side.

12. A safety device according to claim 11 in which the three posts are angularly inclined to extend from the internal surface of the base portion.

13. A safety device according to claim 12 in which the two posts in alignment with each other are angularly inclined in a first direction, whereas the third post is angularly inclined in a second direction, the first direction and second direction being oppositely inclined towards one another, so that the respective end portions of the respective posts are closer together than the respective proximal ends.

14. A safety device according to claim 13 in which the end portions of the posts are provided with enlarged head portions, overhanging ledge portions, or undercut rebate portions, so as to overlie the hook to assist in preventing accidental or inadvertent dislodgment of the hook when located in the positive retaining means.

15. A safety device according to claim 14 in which the end portions of the posts are deflected from their respective at-rest positions to allow the hook to be located between the posts, said end portions returning to their respective at-rest positions after the hook has been forced past the end portions when being located in between at least two of the posts.

16. A safety device according to claim 8 in which the three posts are arranged in substantially parallel relationship to one another or are arranged to extend substantially angularly inclined to one another.

17. A safety device according to claim 2 in which the positive retaining means further includes a tube extending from an internal surface of the lid portion.

18. A safety device according to claim 17 in which the tube is an open-ended, cylindrical tube extending substantially perpendicularly from the plane of the inner face or interior surface of the lid portion.

19. A safety device according to claim 18 in which the tube has a diameter which is greater than distances between the individual posts and thickness of the posts forming the positive retaining means, so that the posts are collectively received within the tube when the lid is in the closed configuration.

20. A safety device according to claim 19 in which the cylindrical tube has an open distal end and a proximal end, wherein the distal end or rim of the open tube contacts a part of the hook when located between any two of the three posts forming the positive retaining means when the lid is in the closed configuration to further assist in restraining the hook in place in the device when in the closed configuration.

21. A safety device according to claim 2 in which the base portion further includes a fishing line receiving portion for receiving the fishing line attached to the hook when the hook is located in the device.

22. A safety device according to claim 21 in which the fishing line receiving portion is a V-shaped or U-shaped notch, groove, or cut-out.

23. A safety device according to claim 2 in which the lid portion further includes a fishing line contacting member for engaging the fishing line when located in the fishing line receiving portion when the device is in a closed configuration.

24. A safety device according to claim 23 in which the fishing line contacting member is in the form of an extension, cover, flange, tab, or lug extending from an edge of the lid portion.

25. A safety device according to claim 23 wherein the receptacle is in the form of a generally one-piece, generally truncated triangular of pyramidal shaped plastic case or box having an apex and a base end or side, in which the fishing line receiving portion and the fishing line contacting portion are both located at or towards the apex of the truncated triangular case or box.

26. A safety device according to claim 25 in which the fishing line contacting member either completely or partially closes over the fishing line receiving means to clamp or otherwise restrain the fishing line from moving when in the fishing line receiving means, in order to further assist in retaining the hook safely in place in the device when in the closed configuration, by assisting in maintaining pre-applied tension to the fishing line.

27. A safety device according to claim 2 further including a catch means for positively locking the hinged lid to the base portion in the closed configuration, said catch means being in the form of a snap lock arrangement for further assisting in restraining the hook in the safety device when in the closed configuration.

28. A safety device according to claim 27 in which the snap lock arrangement includes a tab and a complementary shaped groove or slot for receiving the tab when the lid is in the closed configuration.

29. A safety device according to claim 1 wherein the receptacle is in the form of a generally one-piece, generally truncated triangular or pyramidal shaped plastic case or box having an apex and a base end or side.

30. A safety device according to claim 1 further including a support means for use in connecting the safety device to a substrate.

* * * * *